United States Patent [19]

Harada et al.

[11] Patent Number: 4,802,019

[45] Date of Patent: Jan. 31, 1989

[54] PICTURE PROCESSING SYSTEM FOR SELECTIVE DISPLAY

[76] Inventors: Zenji Harada, 2-25-2, Uguisudai, Kawanishi-shi, Hyogo-ken; Osamu Teraoka, 13-7, Akasakadai 5-chome, Sakai-shi, Osaka; Tsuneo Mikado, 4-1-5-307, Shimomeguro, Meguro-ku, Tokyo, all of Japan

[21] Appl. No.: 862,041

[22] Filed: May 12, 1986

Related U.S. Application Data

[63] Continuation-in-part of Ser. No. 455,115, Jan. 3, 1983, abandoned.

[30] Foreign Application Priority Data

Jan. 11, 1982 [JP] Japan ................................. 57-2531
Jan. 20, 1982 [JP] Japan ................................. 57-6971

[51] Int. Cl.4 ............................................. H04N 5/76
[52] U.S. Cl. ....................................... 358/335; 369/32; 360/10.1; 360/72.2; 360/33.1; 358/183; 340/707
[58] Field of Search ................... 369/30, 32; 360/10.1, 360/72.2, 33.1, 35.1, 9.1; 358/335, 183, 342, 22; 340/721, 723, 724, 731, 747, 707

[56] References Cited

U.S. PATENT DOCUMENTS

| | | | |
|---|---|---|---|
| 3,801,741 | 4/1974 | Ablett | 340/707 |
| 3,825,674 | 7/1974 | Justice | 358/183 |
| 4,058,840 | 11/1977 | Kasprzak | 360/35.1 |
| 4,070,710 | 1/1978 | Sukonichi | 364/900 |
| 4,107,780 | 8/1978 | Grimsdale | 340/721 |
| 4,266,242 | 5/1981 | McCoy | 358/22 |
| 4,317,114 | 2/1982 | Walker | 340/721 |
| 4,321,635 | 3/1982 | Tsuyuguchi | 360/72.2 |
| 4,366,475 | 12/1982 | Kishi | 340/731 |
| 4,395,707 | 7/1983 | Satrapa | 340/703 |
| 4,484,192 | 11/1984 | Seitz | 340/721 |

Primary Examiner—Alan Faber
Attorney, Agent, or Firm—Woodcock Washburn Kurtz Mackiewicz & Norris

[57] ABSTRACT

A picture processing system for displaying a plurality of still pictures recorded in a recording member. The recording member has index tracks for storing a series of information representative of a plurality of squeezed still pictures corresponding to the original still pictures. A group of squeezed still pictures is displayed in multiple segmented areas formed on an index screen accompanied by reference numerals. A light pen and a sensing circuit is provided for rearranging the index screen. The light pen detects the position of said segmented areas and intermediate regions respectively provided between two adjacent areas for processing the rearrangement.

9 Claims, 4 Drawing Sheets

| 1 | 5 | 2 | 3 |
|---|---|---|---|
| 4 | 6 | 7 | 8 |
| 9 | 10 | 11 | 12 |
| 13 | 14 | 15 | 16 |

| 1 | 2 | 3 | 4 |
|---|---|---|---|
| 5 | 6 | 7 | 8 |
| 9 | 10 | 11 | 12 |
| 13 | 14 | 15 | 16 |

17  15  ―16

PICTURE PROCESSING SYSTEM FOR SELECTIVE DISPLAY

This is a continuation-in-part of U.S. application Ser. No. 455,115, filed Jan. 3, 1983, now abandoned.

BACKGROUND OF THE INVENTION

1. Field of the Invention

This invention relates to a picture processing apparatus for selecting a desired picture from a plurality of still pictures formed on a monitor screen by means of selecting means and rearranging them in a desired order.

2. Description of the Prior Art

A picture display system for reproducing digital information representative of a plurality of still pictures (about 100 fields, for example) recorded in a disk type recording medium and displaying it on a monitor has been well known as prior art. Such a system as this is generally used, in a TV station for example, for a programming apparatus of a picture on-air control system by which programs in a predetermined order arranged in advance are automatically progressed by use of a plurality of VTRs. In this programming apparatus, picture or character information representative of the contents of each program such as news program or commercial program is recorded in a floppy disk and the like in the form of one still picture information. This information is rearranged in the desired order while reading it out at the time of making the program. The picture on-air control system is controlled with the rearranged information.

In this type of programming apparatus, it generally takes approximately 0.4 sec. to reproduce the still picture of one field and a time interval of 1.6 sec. is required for the case of color picture consisting of four fields in one unit of color frame. Thus, an extremely large amount of time is required to find out the desired pictures. Alternatively, a method of selecting the desired picture information through an index in the form of a document is conceivable but it is impossible to express the contents of the picture completely by use of the document and it also takes alot of time to fabricate such index as mentioned above.

A picture display system was proposed by the same assignee as that of this invention in U.S. patent application Ser. No. 437,317, filed on Oct. 25, 1982, now abandoned, in which the problems mentioned above are settled. In the picture display system, a plurality of still pictures are recorded in a recording member. The recording member has index tracks for storing a series of information representative of a plurality of squeezed still pictures corresponding to the original still pictures. An index screen is formed on which a group of squeezed still pictures is displayed in multiple segmented areas prepared on the screen accompanied by reference numerals.

By using this type of index screen, program arrangement tasks can drastically be simplified. In short, the contents of the plurality of still pictures can be observed at a glance by looking into the index screen without having to reproduce and display them one by one. In addition, a program advancing schedule can be completed by selecting the pictures on the index screen in the desired order.

It will also be possible to know the schedule of programs through the index screen. In short, the scheduled programs can be displayed on the index screen with an arrangement of squeezed picture elements. The programmed index screen can be formed by selecting the squeezed pictures in order of program, storing the selected picture information in a picture memory one after another and then reading out the programmed information. In this case, alteration or rearrangement of program requires replacement or insertion of the squeezed pictures on the index screen indicating an arrangement in accordance with a certain schedule.

Generally, the selection, replacement and insertion of the squeezed pictures on the index screen are achieved through a key input unit including ten keys for data input and function keys such as "Insert" key, "Change" key or "Execution" key for operation command.

The key input operation in very troublesome when the alteration or rearrangement of program is requested during on-air of the program. And the key input operation is apt to cause errors, resulting in on-air accidents.

SUMMARY OF THE INVENTION

It is therefore a primary object of the present invention to settle such drawbacks as mentioned above, that is, to accomplish quick selection of the desired pictures from a plurality of squeezed still pictures on the index screen.

Another object of the present invention is to accomplish simple and accurate insertion of the selected pictures into the desired positions between the still pictures arranged on the index screen.

BRIEF DESCRIPTION OF THE DRAWINGS

For a better understanding of the present invention, its construction and mode of operation, reference is made to the following description of preferred embodiments and the appended drawings in which:

FIG. 2 shows a front view of an index screen used for explaining quick selection of the desired pictures;

FIGS. 3 and 4 show views similar to FIG. 2 and used for explaining simple and accurate insertion of the desired pictures; and FIG. 5 shows a plane view of an X-Y coordinate input device to be mounted on a screen.

DESCRIPTION OF THE PREFERRED EMBODIMENT

Figure 1:
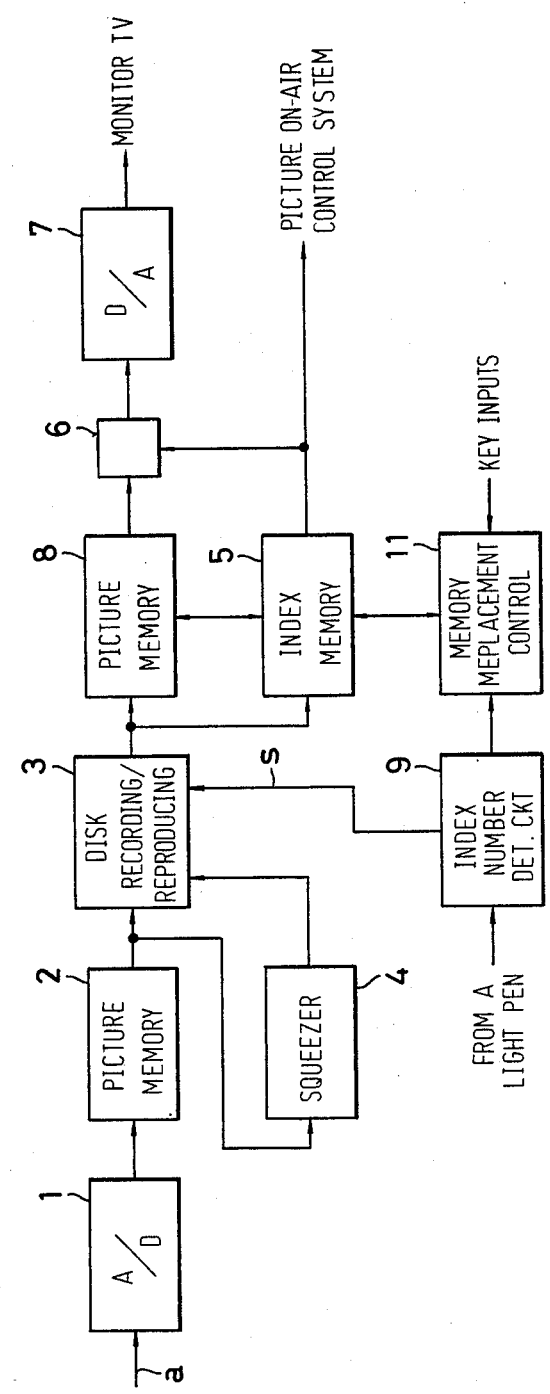
FIG. 1 shows a block diagram of a picture processing apparatus in accordance with the present invention.

Referring now to FIG. 1 wherein a block diagram of the picture processing apparatus in accordance with the present invention is illustrated, an input video signal a is converted into a series of digital signals and the still picture information of one color frame is written into a picture memory 2. The outputs read out of the memory 2 are supplied to a disk type recording/reproducing apparatus 3 and then recorded therein. By repeating this recording operation, picture information corresponding to a plurality of still pictures can be recorded to the disk. The speed for reading the picture memory 2 is modified so as to match the speed of rotation of the disk.

The outputs of the picture memory 2 are also provided to a "squeezer" or reducer circuit 4. The reducer circuit 4 has a specific function to reduce or "squeeze" the picture size to one-sixteenth the original size and is so constructed that three scanning lines are thinned or removed out of four scanning lines and three sampling points on the scanning line are thinned or removed out of four sampling points at the time of analog/digital conversion, for example. The outputs of the reducer circuit 4 are fed to the disk type recording/reproducing apparatus 3 and recorded in a predetermined part, that is, tracks assigned for index recording.

In reproduction operation, the outputs reproduced from the index track in the disk type recording/reproducing apparatus 3 are first supplied to an index memory 5 and recorded therein as information for one index screen. The outputs of the index memory 5 are then delivered to a D/A converter 7 through a changeover device 6 and converted therein to analog picture signals. The outputs of the D/A converter 7 are applied to a monitor television (TV) and then displayed on a screen thereof.

Figures 2, 3:
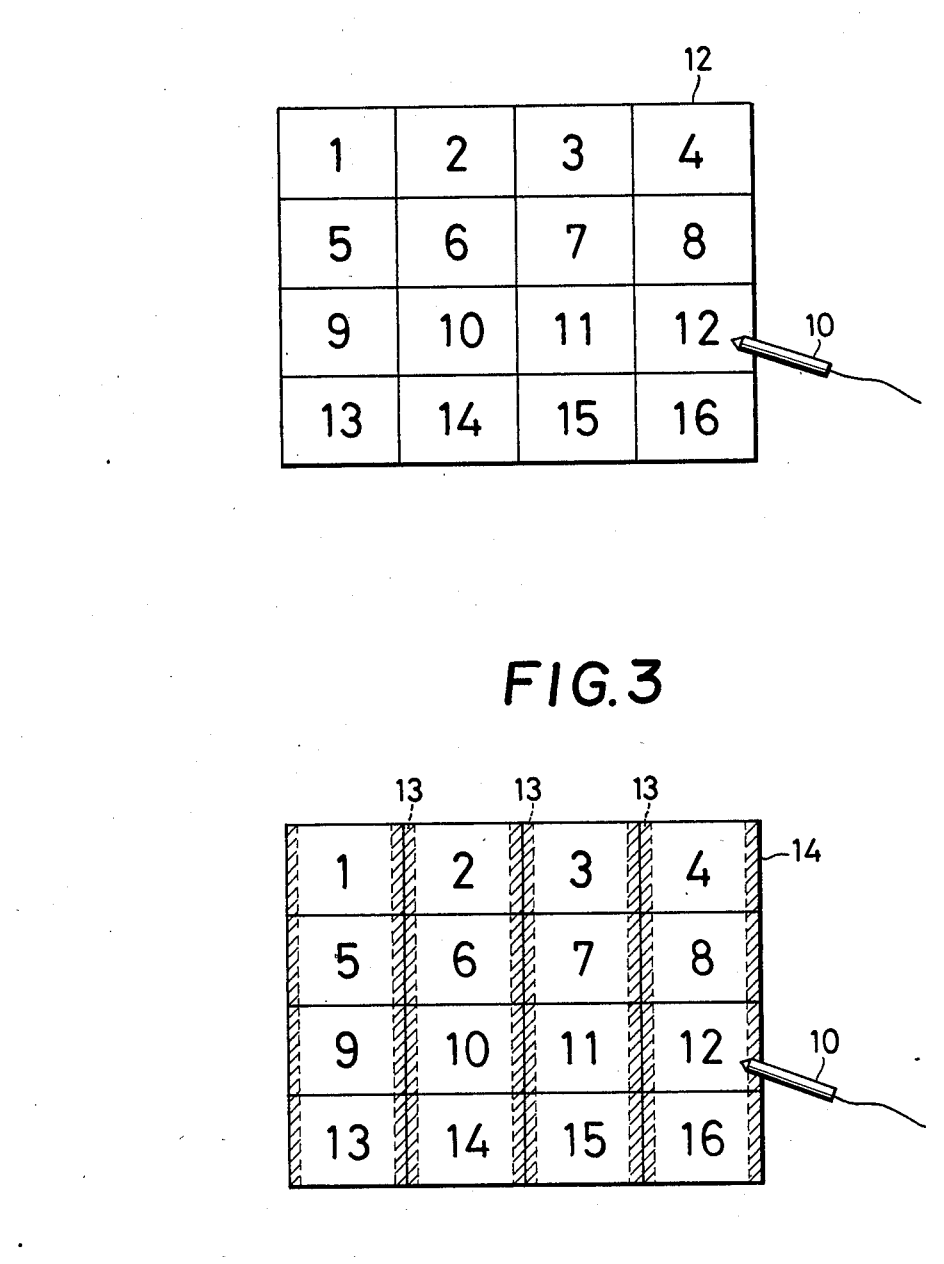

As clearly indicated in FIG. 2, the screen 12 of the monitor TV is divided into a plurality of segments (in this example, 16 segments) and each of the "squeezed" still pictures is displayed on each of the segments (1 to 16). To the respective segments, the reference numerals 1 to 16 are assigned by superimposing them on the pictures or by noting them down on a transparent plate located in front of the screen. In this example, the screen 12, including a group of "squeezed" still pictures and reference numerals will be used as an index screen.

Like these, the required information can be selected by looking into the index screen 12 of FIG. 2. The selected still picture information will be reproduced by giving instructions representative of the index reference numerals to the disk type recording/reproducing apparatus 3, which can access in a random manner to any one of the required tracks. The reproduced signals will be recorded in the picture memory 8. As previously described, the outputs of the picture memory 8 will be fed to the monitor TV via the changeover device 6 and the D/A converter 7 and displayed on the screen 12 thereof as a selected still picture.

In this paragraph, the selection of the desired still pictures by utilization of the index screen 12 illustrated in FIG. 2 will be concretely explained. The index reference data representing a respective "squeezed" picture can be detected by means of a light pen 10. The information corresponding to the desired index number is detected through a detecting circuit 9 by directing the light pen 10 onto one of the "squeezed" still pictures to be selected.

The output of the detecting circuit 9 is provided to the disk type recording/reproducing apparatus 3 on line S. A selected still picture information is reproduced therefrom, and then recorded in the picture memory 8. The outputs of the picture memory 8 are provided to the monitor TV through the changeover device 6 and the D/A converter 7 and displayed on the screen thereof as a selected still picture pattern.

Next, the selection, replacement and insertion operation for "squeezed" index pictures in the case where a second index screen 14 shown in FIG. 3 is utilized instead of the first index screen 12 will be explained. As clearly indicated in FIG. 3, the second index screen 14 is provided with intermediate regions 13 between the respective segments. The intermediate regions 13 can be represented by gate signals produced on the basis of horizontal and vertical sync signals and detected depending on the gate signals at a time when the intermediate regions 13 are designated by means of the light pen 10.

In making a desired schedule of TV programs, the operator reads out index pictures from the apparatus 3 just as mentioned before and then selects the picture displayed on the index screen 14 in the desired order by means of the light pen 10 to obtain a series of picture selection information. The output of the index number detecting circuit 9 is fed to a memory replacement control circuit 11 in response to the key input signals selected on a keyboard (not shown). The "squeezed" picture information selected through this step is transferred to the picture memory 8 in the selected order. At the same time, the index reference numbers corresponding to the selected pictures are stored in a schedule memory portion of the index memory 5 in the designated order.

When a series of schedules have been completed, the contents of the picture memory 8 are transferred back to the index memory 5 through the manipulation of an "End" key on the keyboard. The contents of the index memory are displayed on the monitor screen through the changeover device 6 and the D/A converter 7 and the scheduled program sequence 1, 2, 3 . . . can be observed on the so called multi-screen 14 shown in FIG. 3.

The sequence of the pictures in the programs may be modified by instructing the picture on the multi-screen by means of the light pen. For example, when the sequence of programs represented by the "squeezed" pictures 6, 7 for example, is to be replaced for example by rearranging the order of that pair of pictures in the sequence, the operator designates the screen segments 6 and 7 to be changed by means of the light pen 10 and manipulates a "change" key on the keyboard. As the result, the memory replacement control circuit 11 is operated so that the "squeezed" picture information corresponding to regions 6, 7 in the index memory 5 is mutually replaced and, at the same time, the index reference numerals written in the schedule memory portion within the index memory 5 are mutually replaced.

Next, rearrangement of the index memory 5 by the operation of inserting another program into the already-scheduled programs will be explained in detail in connection with ordinal methods.

In one typical method, it is assumed that the "squeezed" picture 5 is to be inserted between the "squeezed" pictures 1 and 2, for example. The operator first designates the picture 1 and then the picture 5 by use of the light pen 10 and thereafter manipulates an "Insert" key on the keyboard. The memory replacement control circuit 11 is thereby operated similarly to the above-mentioned replacement operation. As a result, the picture 5 is inserted between the pictures 1 and 2 and the pictures 2, 3 and 4 are shifted by one segment, in order, respectively. This insertion process, however, is liable to lead to error because, when the operator wishes to insert the picture 5 before the picture 2, he may erroneously designate the pictures 2 and 5 in this order by use of the light pen 10 and thereafter manipulate the "Insert" key without following the correct steps: 1→5→, "Insert" key. This operation would result in the mistaken rearrangement: 1, 2, 5, 3 and 4.

To prevent such erroneous operation as this, in this embodiment, the intermediate region 13 is provided between the respective segments on the index screen, as indicated by the hatched region in FIG. 3. As described previously, this intermediate region 13 can be represented by the gate signals produced based on the horizontal and vertical sync signals and it can be detected on the basis of the gate signal obtained when the operator designates the intermediate region 13 by use of the light pen 10.

Now it is assumed that the picture 5 is to be inserted between the pictures 1 and 2 by utilization of the intermediate region 13. In this case, the operator first designates the picture 5 and then the intermediate region 13 located between the pictures 1 and 2 and thereafter manipulates the "Insert" key on the keyboard. The respective outputs of the index number detecting circuit 9 and the "Insert" key are thereby fed to the memory replacement control circuit 11 and the insert operation for the "squeezed" pictures and the reference numerals is carried out. As a result, such a rearranged program as shown on the monitor screen 14 in FIG. 4 is obtained. As clearly understood from the foregoing, the aforesaid insertion process is extremely simple and any erroneous operation can be avoided.

An X-Y coordinate input device may be used as well as the light pen 10. This input device may be a conventional one which is formed by arranging transparent electro-conductive films and the like in the form of a key switch train 17 in a form of matrix as indicated in FIG. 5. The necessary pictures can be selected by disposing the transparent input device over the monitor screen so as to touch it directly and manipulating some of the coordinate keys corresponding to the "squeezed" index pictures on the monitor screen.

In addition, if a key switch train 15 corresponding to the intermediate region 13 of FIG. 3 is arranged between the key switch trains 17 located on the respective picture segments as shown in FIG. 5, they can be used at the time of insertion operation. Since the insertion operation is just similar to the case of the light pen, the operator first selects the pictures to be inserted by use of the key switch train 17 and then manipulates the key switch train 15 showing the position for insertion.

As clearly understood from the foregoing, the picture processing apparatus of this invention is so constructed that the "squeezed" still pictures can be displayed on one screen divided into a plurality of segmented areas and each segment and the intermediate between the segments can be selected on the screen. Rearrangement operation of the multiple segmented screen, such as insertion operation, can be easily achieved without errors, by designating one of the segments and one of the intermediate regions.

Figure 6:
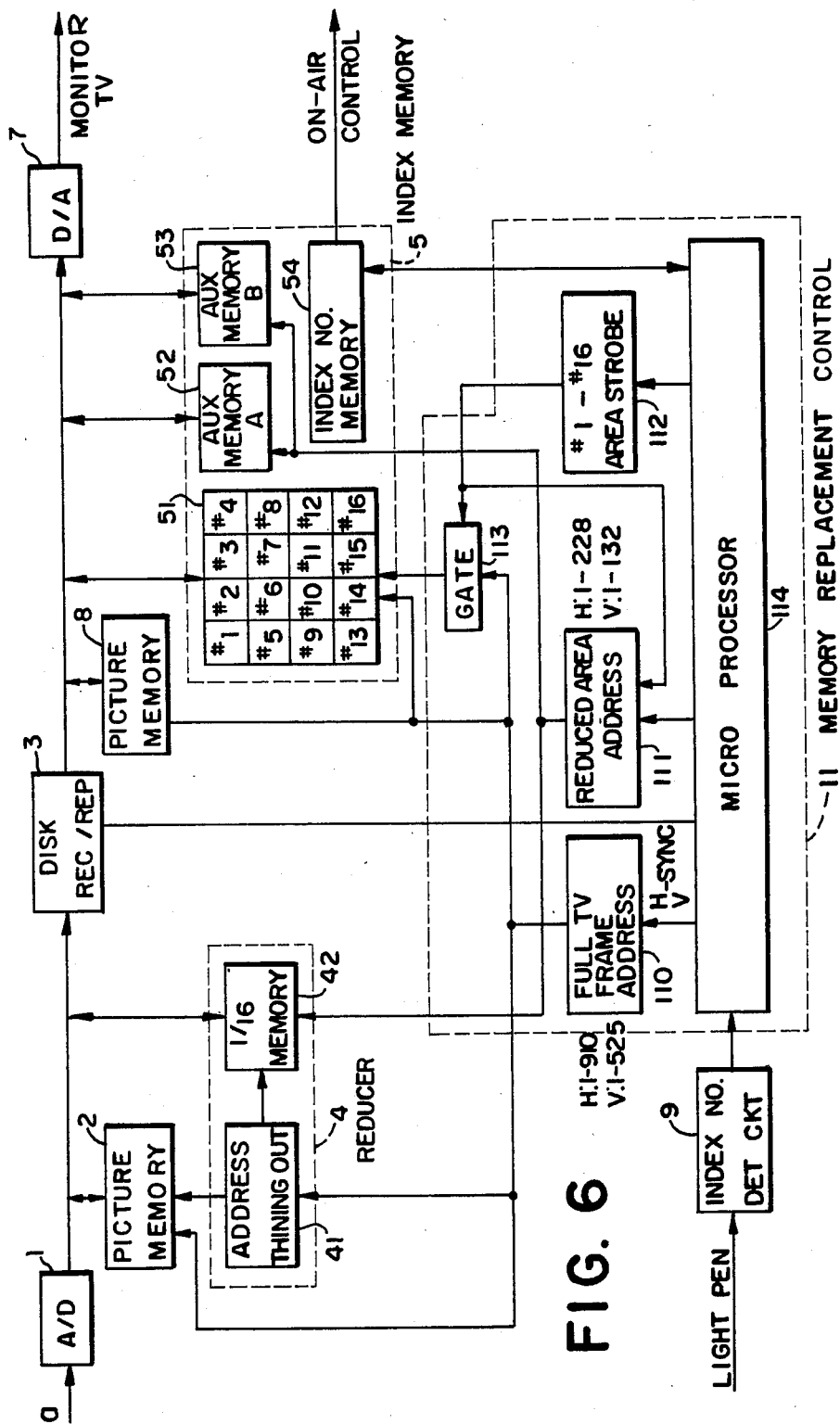
FIG. 6 shows a detailed block diagram of the system of FIG. 1.

FIG. 6 shows a detailed block diagram of the system of FIG. 1. In FIG. 6, a digitized video signal from the analog-digital converter 1 is stored in the picture memory 2 having a size corresponding a full TV frame area. A write address is supplied to the memory 2 from a full TV frame address generator 110 for recording the full frame picture data. The address consists of horizontal picture element and vertical addresses 1–910 incremented by one for each horizontal picture element and vertical addresses 1–525 incremented by one for each horizontal line. The content of the picture memory 2 is read out to be recorded on a track of the disk recording-/reproducing apparatus 3. Read address is supplied from the full TV frame address generator 110 to the picture memory 2 at a slow rate corresponding to the recording speed of the disk apparatus 3.

For reducing a full frame image into 1/16 of the original, a read address is supplied from the full TV frame address generator 110 through an address circuit 41 which passes only addresses having a bit pattern (01) in the rightmost two bits thereof. Addresses having other bit patterns (00, 10 and 11) in the rightmost two bits are not passed. It means that horizontal and vertical addresses representatives of 1, 5, 9 . . . are supplied to the picture memory 2 to read out a reduced picture being one-fourth both in horizontal and vertical directions. At the same time, a write address is supplied to a 1/16 memory 42 for storing the read-out reduced picture data from the picture memory 2. The write address is identical with the thinned out address from the address thinning out circuit 41 but the rightmost two bits (01) thereof are deleted. The write address designates 1/16-sized memory area for storing the reduced picture image and consists of horizontal H and vertical V addresses incrementing by one, representing 1–228 (H) and 1–132 (V).

The content of 1/16 memory 42 are read out and transferred to the disk apparatus 3 to be recorded on an index track thereof. A read address is supplied to the 1/16 memory 42 from a reduced area address generator 111 at a slow rate corresponding to the recording speed of the disk. The address generator 111 generates horizontal and vertical addresses H-address 1–228 and V-address 1–132 respectively.

The control circuit of the disk drive 3 selects still picture tracks and reduced picture tracks in accordance with the signal to be recorded under the control of micro processor 114.

For reproduction, data representing a reproduced picture is stored in the picture memory 8 and the stored data is read out to a monitor TV 12 (See FIG. 2) through the digital-analog converter 7. A write address and a read address are generated in the full TV frame address generator 110 and supplied to the picture memory 8. The rate of the write address is synchronized with the reproduction from disk 3 and the rate of the read address is synchronized with the time base of the real video signal.

The index memory 5 comprises a full TV frame memory 51 for storing data corresponding to one index still picture which consists of 16 segmented areas in each of which a reduced picture corresponding to one full frame TV still picture is displayed. Each of the multiple segmented areas corresponds to a predetermined location in the memory 51. Each of the predetermined locations has a unique address and stores the digital signals (i.e. data) for one reduced still picture image. Write and read addresses are supplied in the same manner with the write and read operation of the picture memory 8, thus displaying an index picture on the monitor screen.

The index memory 5 further comprises two auxiliary memories 52 and 53 labeled as "A" and "B", which are employed for memory replacement control. Each of the auxiliary memories is the same size as the 1/16 memory 42 for storing the data of one reduced picture. The reduced area address generator 111 supplies write and read addresses (1–228 (H) and 1–132 (V)).

An area strobe signal generator 112 is provided in the memory replacement control circuit 11. The generator 112 generates a strobe signal corresponding to one of the segmented areas #1–#16 within one index picture. The strobe signal is generated in synchronism with the full frame address generation by the full frame address generator 110.

Rearrangement of the reduced still pictures in the index picture will now be explained. "Rearrangement" and similar words are used to refer generically to either the exchange of locations of two reduced still pictures in the index picture or the movement of one reduced still picture image at an initial location in the index picture in a new location between a pair of adjacent reduced still pictures in the index picture. With respect to the described embodiment, rearrangement and similar terms refer to the steps of relocating reduced still picture image digital signals in the index memory among the predetermined memory locations to accomplish the aforesaid modifications to the index picture.

For exchange of two of 16 segments in the index memory 51, the two segments, #6 and #7 for example, are designated by a light pen, the operation of which is detected by the index number detection circuit 9 and acknowledged to the micro processor 114. The processor 11 gives a command signal to the area strobe signal generator 112 to generate #6 and #7 strobe signals in that order. The strobe signals are supplied to a gate circuit 113 for strobing a full frame read address from the address generator 110.

Strobed addresses corresponding to segments #6 and #7 are fed in this order to the index memory 51 for reading out the data in the segments #6 and #7. Simultaneously, write addresses are supplied from the reduced area address generator 111 to the auxiliary memories 52 and 53 in synchronism with respective timing of the strobe signals. As a result, contents of the segments #6 and #7 are respectively transferred to the memories 52 and 53 (#6→A, #7→B).

Then, strobe signals for segments #7 and #6 are generated in that order to strobe and feed write addresses from the full TV frame address generator 110 to the index memory 51 through the gate circuit 13, while read addresses are supplied to the auxiliary memories 52 and 53 in synchronism with the strobe signals. As a result, contents of the auxiliary memories 52 and 53 are retransferred to the segment areas #7 and #6 (A→#7, B→#6), thus completing the exchange of reduced pictures digital signals stored in the index picture memory between the index memory locations for multiple segment locations #6 and #7.

For insertion of one selected segment between two adjacent segments, a segment, for example, is first designated and then one of intermediate regions 13 located between a pair of segments, the region 13 between segments #1 and #2, for example, is designated by a light pen. The detecting circuit 9 detects these designations and sends appropriate signals to the micro processor 114. The micro processor 114 controls the full TV frame address generator 110, reduced area address generator 111 and area strobe signal generator 112 in the similar manner as explained in the exchange mode. Following five steps are carried out in the insertion operation.

|     |             |
| --- | ----------- |
| (1) | #5 → A      |
| (2) | #4 → B → #5 |
| (3) | #3 → B → #4 |
| (4) | #2 → B → #3 |
| (5) | A → #2      |

Segment #5 is moved to memory 52 for storage. Each segment #4 through #2 is moved to the remaining memory 53 (B) and then to the next higher segment location freeing the segment 2 location into which the contents of memory (52) is read. Consequently, the reduced picture in the #5 segment is inserted between segments #1 and #2 so as to complete the rearrangement shown in FIG. 4.

An index number memory 54 is employed in the index memory 5. In the index number memory 54, index numbers corresponding to the arrangement of index segment pictures on the index screen are stored under control of the micro processor 114. The content of the index number memory 54 is read out as a program schedule information to be used for on air control.

This invention having been described in its preferred embodiments, it is clear that numerous modifications and changes may be made by those skilled in the art without departing from the broader scope and spirit of the invention.

What is claimed is:

1. A picture processing system comprising a recording member in which a plurality of full TV screen still picture digital signals is recorded, each signal corresponding to a different still picture, and a monitoring means for reproducing one of said still picture digital signals and displaying the corresponding still picture on a screen, said recording member having an index recording portion in which a second plurality of digital signals is recorded, each digital signal of the second plurality corresponding to a reduced still picture and one reduced still picture digital signal being provided for each still picture, and said monitoring means including: index memory means for storing a group of reduced still picture digital signals from said recording member in predetermined memory locations as a single full TV screen index picture; circuit means for coupling the index memory means and said screen to display the group of said reduced still pictures stored in said index memory means in multiple segmented areas on said screen as an index picture; selecting means for designating multiple segmented areas on said screen to select reduced still pictures displayed in said areas; a detecting circuit for detecting the position of segmented areas designated by said selecting means on the basis of horizontal and vertical sync signals for said screen, said detecting circuit including means for detecting intermediate regions respectively provided between adjacent segmented areas on said screen; and memory control means for rearranging the locations of said reduced still picture signals stored in said index memory means on the basis of the output of said selecting means to rearrange the location of reduced still pictures in said index picture, said memory control means receiving a detecting signal corresponding to one of said intermediate regions for rearranging the contents of said index memory so that a selective one of said displayed reduced still pictures is interposed between two adjacent reduced pictures by designating an intermediate region between said two adjacent reduced pictures displayed on said screen.

2. A picture processing system according to claim 1, wherein said selecting means further comprises a light pen, said detecting circuit detecting the position of said segmented areas designated by said light pen on the basis of horizontal and vertical sync signals for said screen.

3. A picture processing system according to claim 1, wherein said selecting means comprises a transparent keyboard unit provided on said screen, said keyboard unit comprising a matrix of keys, each key corresponding to each of said segmented areas.

4. A picture processing system according to claim 3, wherein said transparent keyboard unit further comprises another matrix of keys, each key corresponding to each intermediate region respectively provided between each pair of adjacent segmented areas and said memory control means receives the output of one of said another matrix of keys corresponding to one of said intermediate regions for rearranging the contents of said index memory so that a selected one of said displayed reduced pictures is interposed between two adjacent reduced pictures by designating an intermediate region between said two adjacent reduced pictures displayed on said screen.

5. A picture processing system according to claim 3, wherein said transparent keyboard unit further comprises another matrix of keys, each key respectively corresponding to an intermediate region between different pairs of adjacent segmented areas, said keys at the intermediate regions being utilized to rearrange the arrangement of said reduced still pictures on said screen.

6. A picture system comprising:
a recording member in which a plurality of still picture signals are recorded; and
a monitoring means for reproducing one of said recorded still picture signals for displaying said one still picture on a screen,
said reproducing member having an index recording portion in which a series of reduced picture signals representative of a plurality of reduced still pictures, each of which correspond to each of said still pictures, is recorded,
a group of said reduced still pictures being selectively displayed in multiple segmented areas formed on said screen as an index to said still pictures, said monitoring means comprising selecting means of a type operative by directly pointing to the surface of said screen for designating one of said multiple segmented areas to select one of said reduced still pictures, and a detecting circuit for detecting the position of said segmented areas designated by said selecting means on the basis of horizontal and vertical sync signals for said screen, said detecting circuit including means for detecting intermediate regions respectively provided between adjacent segmented areas on said screen, a detecting output thereof being utilized to rearrange the arrangement of said reduced still pictures on said screen, and said monitoring means having a random access reproduction function to reproduce one of designated still pictures in response to designation with said selecting means.

7. A picture processing system according to claim 6, wherein said selecting means further comprises a light pen, said detecting circuit detecting the position of said segmented areas designated by said light pen on the basis of horizontal and vertical sync signals for said screen.

8. A picture comprising system according to claim 6, wherein said selecting means further comprises a transparent keyboard unit provided on said screen, said keyboard unit comprising a matrix of keys corresponding to said segmented areas.

9. A picture processing system comprising:
a random access recording and playback member having a main recording portion in which a plurality of still picture signals are electronically recorded and an index recording portion in which a plurality of reduced still picture signals are electronically recorded, each of the reduced still pictures corresponding to a different one of said still pictures; and
a monitoring means including: a screen for displaying either a group of said reduced still pictures in multiple segmented areas formed on said screen as an index to said still pictures or one of said still pictures; selecting means for designating one of said multiple segmented areas to select the reduced still picture displayed therein by directly pointing to the surface of said screen, and for controlling said random access recording and playback member; means for electronically recording the signal of the one still picture corresponding to the selected one of said reduced still pictures; and a detecting circuit for detecting the position of said segmented areas designated by said selecting means on the basis of horizontal and vertical sync signals for said screen, said detecting circuit including means for detecting intermediate regions respectively provided between adjacent segmented areas on said screen, a detecting output thereof being utilized to rearrange the arrangement of said reduced still pictures on said screen.

* * * * *